Sept. 17, 1929.    H. BINTE    1,728,657
SCREENING PLANT FOR COKE AND SIMILAR MATERIALS
Filed June 22, 1928

Inventor:
Hans Binte
By John B. Brady
Attorney

Patented Sept. 17, 1929

1,728,657

UNITED STATES PATENT OFFICE

HANS BINTE, OF BERLIN-SPANDAU, GERMANY, ASSIGNOR TO BAMAG-MEGUIN A.-G., OF BERLIN, GERMANY, A CORPORATION OF GERMANY

SCREENING PLANT FOR COKE AND SIMILAR MATERIALS

Application filed June 22, 1928, Serial No. 287,562, and in Germany March 11, 1926.

This invention relates to a stationary screening plant, for coke and like materials, having two screens mounted (together with their direct-actuating means) in a frame for movement in opposite directions and balanced in respect of their mass and direction of movement.

A screening plant according to the invention differs advantageously from known plants of this kind in that, by means of interposed rollers, the frame is mounted on girders of the plant so as to be freely movable in the direction of the jigging movement, and in that its permissible maximum movement is restricted by means of normally slack buffer springs.

In this manner, vibrations which would have an injurious effect on the stationary portion of the plant are successfully prevented.

Compared with screening plants in which the driving means are located in buildings and result in stretched belts and other inconveniences, the invention has the advantage that the driving members (connecting rods and eccentric shaft), which are mounted in the frame supporting the screens, take no part in the disturbing vibrations. As, according to the invention, the frame is free to move only in the direction of the jigging movement, the absence of freedom of movement of the frame transversely in relation to the jigging movement becomes insignificant.

Although the major portion of the balancing of the masses is effected by the known measure of moving the two screens in opposite directions in a uniform manner, the highly adverse residual off balance and the accompanying external manifestations of energy are absorbed mainly by the permitted slight reciprocating motion of the frame, which runs on rollers, and any further small excess of these external forces is finally rendered harmless by the buffer springs. Hence a damping of the injurious vibrations is effected in three different stages of sensitiveness.

Figure 1:
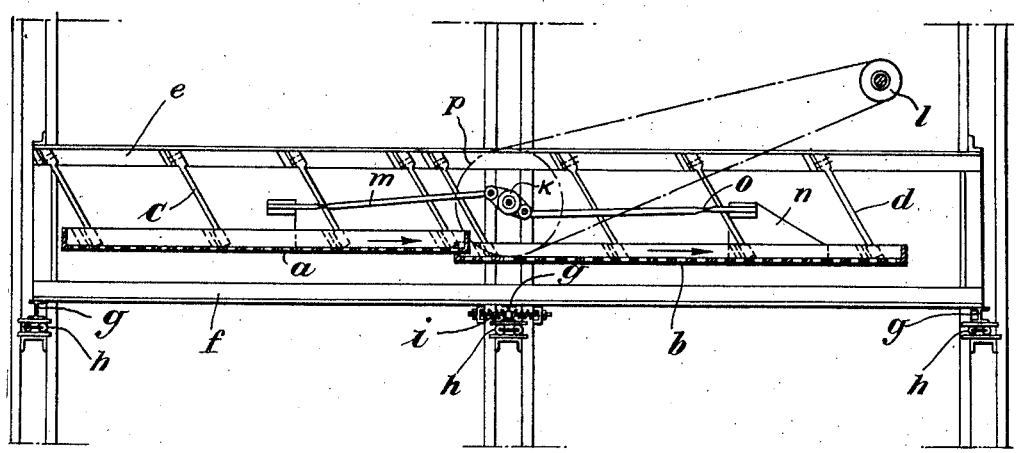
Figure 2:
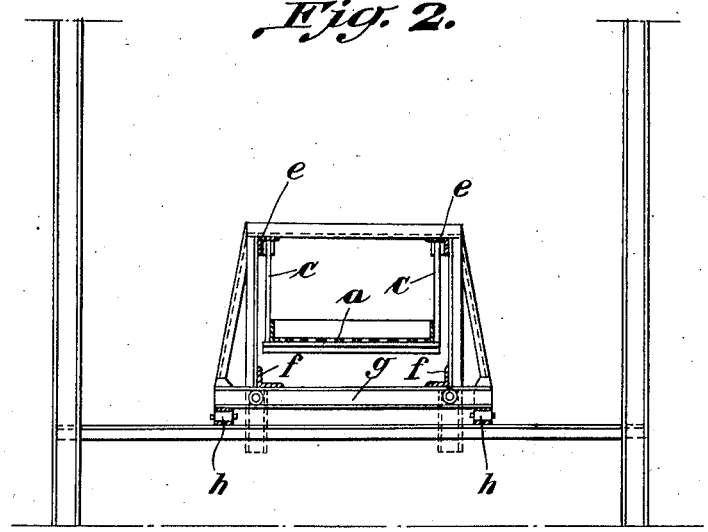

An embodiment of the invention is illustrated, by way of example, in the accompanying drawing, on which: Fig. 1 is a side elevation and Fig. 2 a lateral cross-sectional view through the screening plant of my invention.

The two screens $a$ and $b$ are suspended, by means of flexible stays $c$ and $d$, from the upper boom $e$ of the frame whose lower boom $f$ is mounted, by means of bearers $g$ carrying rollers $h$, on the transverse girders of the plant.

The screens are provided with brackets $n$, to which are attached the ends of connecting rods $m$ arranged to be set in opposite motion by the crankshaft $k$ rotated by the driving pulley $p$, the latter being actuated by the motor $l$, which is preferably also mounted on the frame.

Said flexible stays $c$ and $d$, which are rigidly secured at their ends to the upper boom $e$ and to the cheeks of the screens, are disposed obliquely in the one direction, so that the material under treatment, which is projected forwards by the movement of the screens, is transported in the direction of the arrow.

When the screens are set in motion, the unbalanced forces are transmitted to the frame which absorbs said forces by slight movements of its own mass, said movements being transmitted to the girders of the plant without friction, in consequence of the provision of the rollers $h$.

In the exceptional event of these slight movements exceeding the permissible maximum, they are damped by buffer springs $i$ arranged to be normally in the slack condition.

I claim:—

1. In a stationary screening plant the combination of a frame, a pair of screens mounted therein for movement in opposite directions and balanced in respect of mass and direction of movement, means for actuating the screens, means supporting the frame so that it is freely movable in the longitudinal direction of the screens, and cushioning means for limiting the maximum permissible movement of the frame.

2. In a stationary screening plant the combination of a frame, a pair of screens mounted therein for movement in opposite directions and balanced in respect of mass and direction of movement, means for actuating the screens, rollers supporting the frame for movement in the longitudinal direction of the screens, and cushioning means for limiting the maximum permissible movement of the frame.

3. In a stationary screening plant the combination of a frame, a pair of screens mounted therein for movement in opposite directions and balanced in respect of mass and direction of movement, means for actuating the screens, means supporting the frame so that it is freely movable in the longitudinal direction of the screens, and normally slack buffer springs for limiting the maximum permissible movement of the frame.

4. In a stationary screen plant the combination of a frame, a pair of screens mounted therein for movement in opposite directions and balanced in respect of mass and direction of movement, the combination of means for actuating the screens, rollers supporting the frame for movement in the longitudinal direction of the screens, and normally slack buffer springs for limiting the maximum permissible movement of the frame.

5. A stationary screening plant comprising in combination a frame, two screens, flexible stays suspending the screens from the frame, means mounted on the frame for moving said screens simultaneously in opposite directions, rollers carried by the frame and supporting the latter for movement in the longitudinal direction of the screens, and spring means for limiting the maximum permissible movement of the frame.

In testimony whereof I affix my signature.

HANS BINTE.